June 29, 1954     R. H. ROUX, JR     2,682,109
DENTAL APPLIANCE
Filed Jan. 27, 1953

INVENTOR.
Dr. Robert H. Roux, Jr.
BY Hugh S. Wertz
ATTORNEY

Patented June 29, 1954

2,682,109

UNITED STATES PATENT OFFICE 2,682,109

DENTAL APPLIANCE

Robert H. Roux, Jr., Savannah, Ga.

Application January 27, 1953, Serial No. 333,428

9 Claims. (Cl. 32—68)

This invention relates to dental appliances and more specifically to devices to facilitate the placement and removal of full dentures from the patient's mouth.

It is an object of this invention to make more accurate the formation of rebasements of full dentures.

It is another object of the invention to provide a dental appliance which simplifies the making of such rebasements.

When taking impressions for the rebasing of full dentures, the dentist has been in the habit of lining the entire tissue area of the denture with a suitable impression material, such as, for example, an alginate material, or plaster of Paris. The denture is properly placed in the patient's mouth and is held securely in place by the dentist during the setting period of the impression material, whereupon the denture and impression material are removed as a unit. Due to accurate tissue adaptation, excess tissue coverage and molecular attraction, this unit is frequently very difficult to remove from the mouth without distortion as it has been found necessary in the past to "rock" the denture or to secure release of one part of it before another part thereof. Such "rocking" or non-simultaneous release is a major cause of distortion of such impressions.

In accordance with the present invention, such causes of distortion are removed by providing means for exerting force simultaneously at a plurality of points on both sides of the denture, preferably on the posterior portion thereof. These points can be in the interproximal embrasures of the teeth or in the gum material of the denture. Various adjustments are provided so that the appliance can conform with various arch forms as exhibited on individual dentures. By using the appliance of the invention, the denture is separated from the oral tissues simultaneously at all points thereof, without "rocking."

The invention will be more readily understood by referring to the following description taken in connection with the accompanying drawings forming a part thereof, in which.

Figure 1:
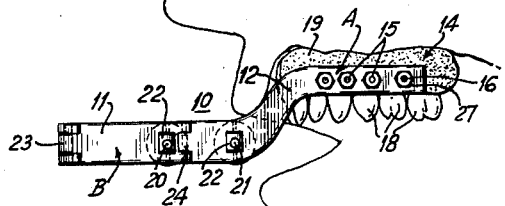
Fig. 1 is a side view of the dental appliance in accordance with the invention, shown in the mouth of a patient and applied to a full upper denture therein.
Figure 2:
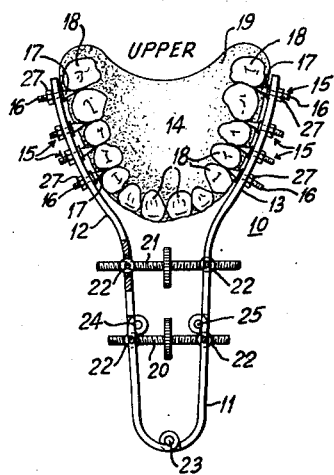
Fig. 2 is a bottom view of the appliance of Fig. 1 showing the retaining points in the interproximal embrasures of the teeth in the denture.
Figure 3:
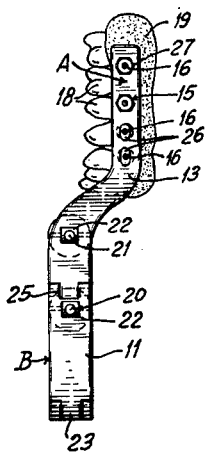
Fig. 3 is a side view of the appliance of Fig. 1 showing some of the retaining point nuts removed to reveal the adjusting slots.
Figure 4:
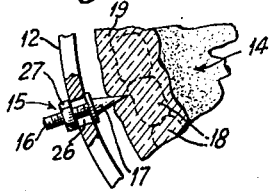
Fig. 4 is a fragmentary view, drawn to a larger scale, showing a retaining point in the gum material of the denture.

Referring more specifically to the drawings, Figs. 1, 2 and 3 show, by way of example for purpose of illustration, a dental appliance 10 in accordance with the invention. The appliance 10 comprises, briefly stated, a bifurcated handle member 11 having two branches 12 and 13 adapted to extend respectively around the right and left sides of a full upper denture 14 and a plurality of retaining points or contact members 15 extending from the branches 12 and 13 to spaced parts of the denture 14 in the mouth of the patient P. Each member 15 comprises (see Fig. 4) a threaded shaft 16 having thereon a sharpened end 17 (which may be either pointed or wedge-shaped) which pierce selected and spaced portions of the denture 14. Sometimes it may be advisable to prepare holes for the ends 17 by means of a dental bur. These spaced portions of the denture may be, for example, in the interproximal embrasures of the teeth 18 (as shown in Fig. 2) or in the gum material 19 (as shown in Fig. 4). The handle 11 has a portion A (in the mouth) which has a different level from that of the exterior portion B so that it is more comfortable for the patient and will not cause abnormal tissue positioning in the regions of the frenula of the lips or tongue or the mucobuccal folds.

In order to accommodate the device 10 to a number of different arch forms, various adjustments are furnished. Adjustment screws 20 and 21, each provided with both right and left hand screws and pivot bearings 22 as in draftsmen's tools, in cooperation with hinges 23, 24 and 25, permit movement of one branch 12 with respect to the other one 13. Movement of the screws 16 along the length of the handle or transverse thereto can be accomplished since these screws are in oversize holes 26 (see Fig. 3). After the screws are placed in the right positions, they are maintained in these positions by tightening nuts 27 with a suitable end type socket wrench.

The operation of the appliance 10 will now be described. The denture 14, while outside the mouth, has the appliance 10 fitted to it. The denture is then lined with a suitable impression material and applied to the roof of the mouth, maxillary arch and appropriate tissues. While the impression material is setting, the denture is held securely in place within the mouth by the dentist, but at the conclusion of this setting period, the denture and impression material are removed as a unit merely by pulling straight down on the handle 11. Due to the exertion of force simultaneously on so many points on the denture, the latter comes loose from the roof of the mouth without distortion of the impression.

Figure 5:
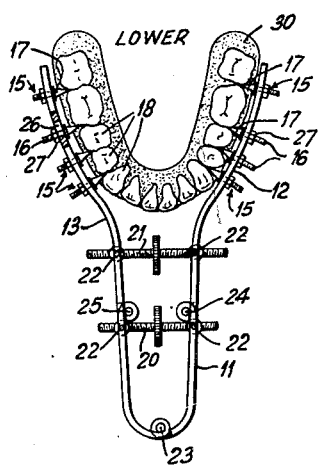
Fig. 5 is a top view of an appliance like that shown in Fig. 2 except that the appliance is shown gripping a full lower denture.

While the invention has been shown and described for use in connection with an upper denture, it will be obvious to one skilled in the art that the principles of the invention are also applicable to lower dentures. Fig. 5 shows the appliance gripping a lower denture 30 which is like the upper denture 14 except that there is a cut-out portion for the tongue. The manner of use of the appliance 10 when used with a lower denture will be obvious from the description above. Moreover, it will be obvious to those skilled in the art that many changes can be made in the embodiments described herein without departing from the spirit of the invention, the scope of which is indicated in the claims.

What is claimed is:

1. A dental appliance adapted to grasp a full denture firmly and evenly while it is in the mouth of the patient, comprising a bifurcated handle member the two branches of which extend respectively around the right and left sides of said denture, and a plurality of contact means supported by each branch of said handle and positioned to apply force to separated parts of each of said sides of the denture.

2. A dental appliance adapted to grasp a full denture firmly and evenly while it is in the mouth of the patient, comprising a bifurcated handle member the two branches of which extend respectively around the right and left sides of said denture, and a plurality of contact means supported by each branch of said handle and positioned to apply force to separated parts of each of said sides of the denture, said separated parts being in the posterior portion of said denture.

3. A dental appliance adapted to grasp a full denture firmly and evenly while it is in the mouth of the patient, comprising a bifurcated handle member the two branches of which extend respectively around the right and left sides of said denture, and a plurality of contact means supported by each branch of said handle and positioned to apply force to separated parts of each of said sides of the denture, at least some of said separated parts being in the interproximal embrasures of the teeth in said denture.

4. A dental appliance adapted to grasp a full denture firmly and evenly while it is in the mouth of the patient, comprising a bifurcated handle member the two branches of which extend respectively around the right and left sides of said denture, and a plurality of contact means supported by each branch of said handle and positioned to apply force to separated parts of each of said sides of the denture, at least some of said separated points being in the gum material of said denture.

5. A dental appliance adapted to grasp a full denture firmly and evenly while it is in the mouth of the patient, comprising a bifurcated handle member the two branches of which extend respectively around the right and left sides of said denture, and a plurality of contact means supported by each branch of said handle and positioned to apply force to separated parts of each of said sides of the denture, each of said branches of the handle having a hinge in the portion outside of the patient's mouth to permit motion of the branches in a horizontal direction.

6. A dental appliance adapted to grasp a full denture firmly and evenly while it is in the mouth of the patient, comprising a bifurcated handle member the two branches of which extend respectively around the right and left sides of said denture, and a plurality of contact means supported by each branch of said handle and positioned to apply force to separated parts of each of said sides of the denture, said handle member having at least one adjustment screw between the two branches thereof.

7. A dental appliance adapted to grasp a full denture firmly and evenly while it is in the mouth of the patient, comprising a bifurcated handle member the two branches of which extend respectively around the right and left sides of said denture, and a plurality of contact means supported by each branch of said handle and positioned to apply force to separated parts of each of said sides of the denture, most of the portion of said handle in the mouth of the patient being at a different vertical level than the portion outside the mouth.

8. A dental appliance adapted to grasp a full denture firmly and evenly while it is in the mouth of the patient, comprising a bifurcated handle member the two branches of which extend respectively around the right and left sides of said denture, and a plurality of contact means supported by each branch of said handle and positioned to apply force to separated parts of each of said sides of the denture, each of said contact means comprising a threaded shaft adapted to pass through a hole in a branch of the handle member and having a sharpened end thereon to engage said denture.

9. A dental appliance adapted to grasp a full denture firmly and evenly while it is in the mouth of the patient, comprising a bifurcated handle member the two branches of which extend respectively around the right and left sides of said denture, and a plurality of contact means supported by each branch of said handle and positioned to apply force to separated parts of each of said sides of the denture, each of said contact means comprising a threaded shaft adapted to pass through an adjustment hole in a branch of the handle member and having a sharpened end thereon to engage said denture, and a nut to retain said shaft in a desired position within said hole.

References Cited in the file of this patent

UNITED STATES PATENTS

| Number | Name | Date |
|---|---|---|
| 481,479 | Deardorff | Aug. 23, 1892 |
| 2,597,929 | Gorsky et al. | May 27, 1952 |